No. 734,370. PATENTED JULY 21, 1903.
J. C. W. ROFE.
SQUEEGEE.
APPLICATION FILED AUG. 29, 1902.
NO MODEL.
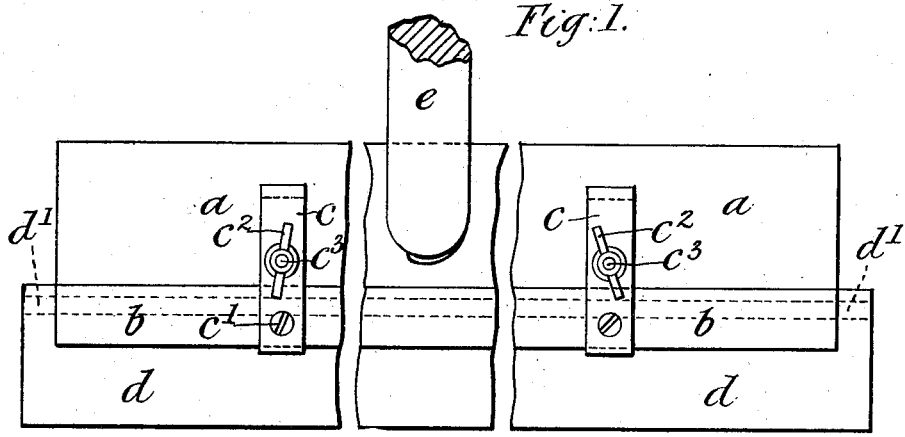
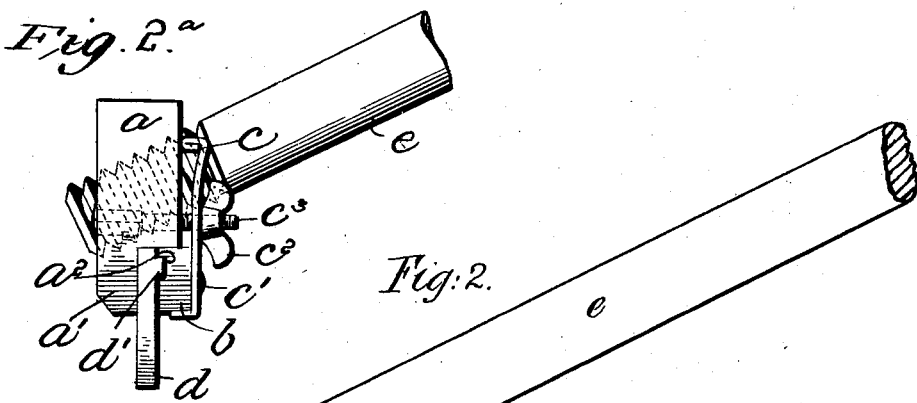
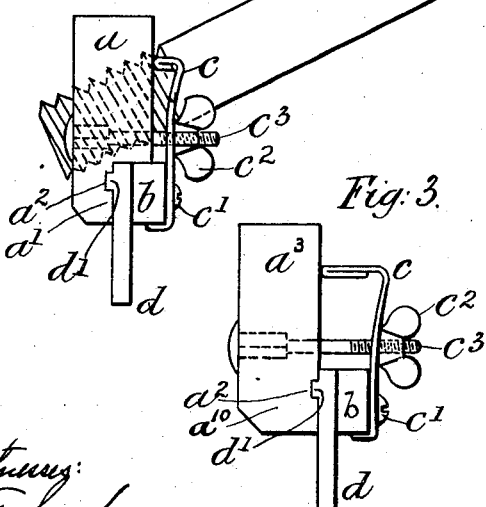
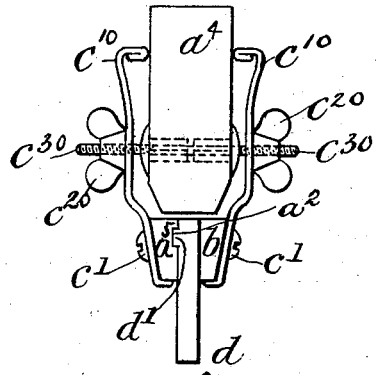
Witnesses:
Inventor
John Charles Wesley Rofe
By Knight Bros.
Attys.

No. 734,370. Patented July 21, 1903.

UNITED STATES PATENT OFFICE.

JOHN C. W. ROFE, OF LEYTONSTONE, ENGLAND, ASSIGNOR TO FREDERICK WILLIAM INGRAM, OF HACKNEY WICK, LONDON, ENGLAND.

SQUEEGEE.

SPECIFICATION forming part of Letters Patent No. 734,370, dated July 21, 1903.

Application filed August 29, 1902. Serial No. 121,440. (No model.)

*To all whom it may concern:*

Be it known that I, JOHN C. W. ROFE, a subject of the King of Great Britain, residing at Leytonstone, in the county of Essex, England, have invented certain new and useful Improvements in Squeegees, of which the following is a full, clear, and exact description.

My invention has for its object an improvement in those squeegees having a head or stock whereby a renewal of the rubber strip may be effected without disconnection of the parts of the head or stock.

I will describe my invention by the aid of the accompanying drawings, in which—

Figure 1 is a rear elevation, and Fig. 2 is an end view, of one form of my improved squeegee head or stock with part of the handle attached thereto. Fig. $2^a$ is a similar view to Fig. 2, showing a slight modification. Figs. 3 and 4 show end views of slightly-modified forms of the head or stock.

I use, according to the form shown at Figs. 1 and 2, a head or stock $a$, formed with a narrow front holding-strip $a'$, located at the lower edge thereof, and a rear holding strip or bar $b$, of wood or metal, located also at the lower edge of the head or stock $a$ against the front holding-strip $a'$. To the rear holding strip or bar $b$ and across the rear face of the head or stock at right angles to its length I fix springs $c$ at a suitable distance apart, such springs $c$ extending beneath the rear holding strip or bar $b$ to provide a support therefor and being fixed to the rear holding strip or bar $b$ by screws $c'$ and to the rear face of the head or stock $a$ by fly or thumb nuts $c^2$, screwed onto screw-pins $c^3$, fixed in the head or stock $a$ and passing through the springs $c$ between the ends of the latter. In the side of the front holding-strip $a'$, or it may be in the inner face of the rear holding strip or bar $b$, as shown in Fig. $2^a$, I form a tongue-groove or recess $a^2$ to receive a tongue or thickened part $d'$ along one face of the rubber strip $d$. By screwing up the fly or thumb nuts $c^2$ any desired pressure can be put on the rubber strip $d$, while by slackening the fly or thumb nuts $c^2$ the pressure can be relieved to enable the rubber strip $d$ to be removed and a new one placed in its stead.

In Figs. 2 and $2^a$ I have shown the front holding-strip $a'$ integral with the head or stock $a$ and of less width than the head or stock $a$; but, as shown in Fig. 3, the front holding-strip $a^{10}$ may also be formed integral with the head or stock $a^3$ and of the same width.

In the form shown in Fig. 4 the front holding-strip $a^5$ is made separate from the head or stock $a^4$, and on each side of the head or stock $a^4$ I fix, according to the length of the head or stock $a^4$, two or more springs $c^{10}$ by fly or thumb nuts $c^{20}$ and screw-pins $c^{30}$, as in the other forms. Such springs project a sufficient distance beyond the bottom edge of the head or stock $a^4$ to allow their projecting ends to be fixed to the front holding-strip $a^5$ and rear holding strips or bars $b$, fitting close to the bottom edge of the head or stock $a^4$, such front holding-strip $a^5$ and rear holding strip or bar $b$ being sprung toward each other with the required force by means of the fly or thumb nuts $c^2$ to firmly grip the rubber strip $d$ between them.

It will be observed that the holding-strips are located beneath the head or stock. A hole, preferably screw-threaded, is provided in the head or stock $a$ for the insertion of a handle $e$, as shown in Figs. 1, 2, and $2^a$.

Having thus described my invention, the following is what I claim as new therein and desire to secure by Letters Patent:

1. A squeegee comprising a head, front and rear holding-strips located beneath the head, one of the holding-strips having a tongue-groove, a rubber strip formed with a tongue, located between the front and rear holding-strips and having its tongue locked in the tongue-groove, screw-pins extending entirely through the head, springs centrally mounted on the screw-pins, having their lower ends fastened to and supporting the rear holding-strip and their upper ends bearing against the rear face of the head, and nuts mounted on the screw-pins and bearing against the springs for clamping the rubber strip between the holding-strips.

2. A squeegee comprising a head, front and rear holding-strips located beneath the head, one of the holding-strips having a tongue-groove, a rubber strip formed with a tongue, located between the front and rear holding-strips and having its tongue locked in the tongue-groove, screw-pins extending entirely through the head, springs centrally mounted on the screw-pins having their lower ends fastened to and supporting the holding-strips and their upper ends bearing against the head, and nuts mounted on the screw-pins and bearing against the springs for clamping the rubber strip between the holding-strips.

In testimony whereof I affix my signature in presence of two witnesses.

J. C. W. ROFE.

Witnesses:
B. J. B. MILLS,
CLAUDE K. MILLS.